F. SCHAFFER.
METHOD OF MAKING CAR WHEELS.
APPLICATION FILED JULY 21, 1915.

1,227,962. Patented May 29, 1917.

Inventor:
Friedrich Schaffer
by [signature]
att.

UNITED STATES PATENT OFFICE.

FRIEDRICH SCHAFFER, OF LEOBERSDORF, AUSTRIA.

METHOD OF MAKING CAR-WHEELS.

1,227,962.  Specification of Letters Patent.  Patented May 29, 1917.

Application filed July 21, 1915. Serial No. 41,069.

*To all whom it may concern:*

Be it known that I, FRIEDRICH SCHAFFER, a works superintendent, subject of the Emperor of Austria, residing at Leobersdorf, Lower Austria, Austria, have invented certain new and useful Improvements in Methods of Making Car-Wheels, of which the following is a specification.

The so-called disk-wheels, such as are used on railway-cars, are made according to the known methods in one piece from one solid block of steel.

Whenever such a disk-wheel is subjected to a treatment by heat, such as is suitable for the particular alloy of steel and which is intended to improve the material, the said wheel will be found in the course of such treatment to undergo stresses of a highly disadvantageous nature which will eventually result in the destruction of the wheel.

A process of first heating and then suddenly cooling down (quenching in water, oil, etc.) the material constitutes either a part or the whole of the treatment by heat. The disk portion of the wheel, being a comparatively thin metal portion and having a large cooling surface, will during the quenching period first cool off and simultaneously shrink, while the tire of the wheel and the hub, representing large masses of metal will much more slowly cool down and shrink.

The shrinkage thus occurring at greatly diverging intervals of time, stresses are bound to arise in the material which will prove injurious to the wheel.

The method forming the subject matter of my invention has for its object to make railway-car wheels which will be able to withstand great and sudden changes of temperature without being thereby subjected to any harmful stress whatsoever.

My improved method consists in making the tire and the disk of the wheel in one part, while the final hub is separately formed, whereby all the advantages of a wheel made of one solid block of steel are maintained, while, on the other hand the tire and the disk part of the wheel are so shaped as to permit their withstanding the heat treatment without causing any stress to be set up in the material.

In the manufacture of the wheel the disk part is provided with radially disposed slots whereby a free contraction of the disk during the quenching process is secured, and the tire is enabled to shrink subsequently without impairing the soundness of the wheel. The inner portion of the wheel is so shaped that the hub can be solidly joined to it.

Figure 1:
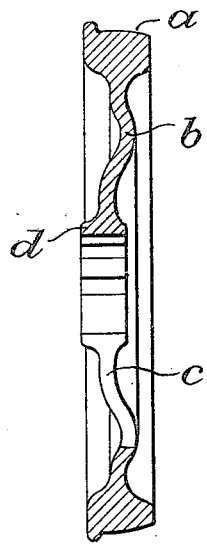
Figure 2:
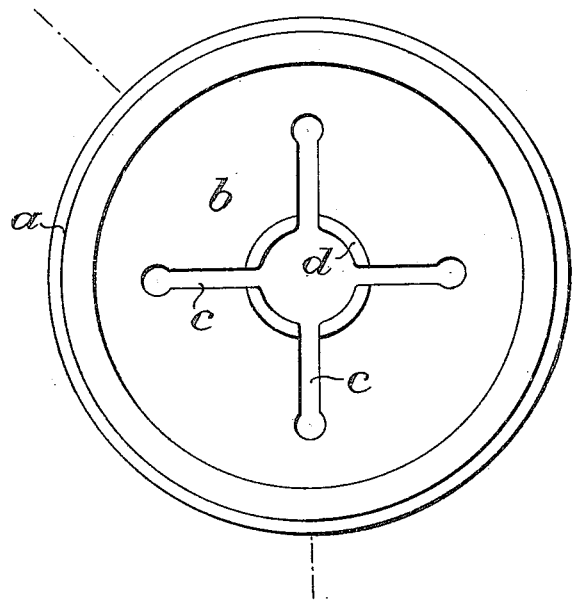
Figure 3:
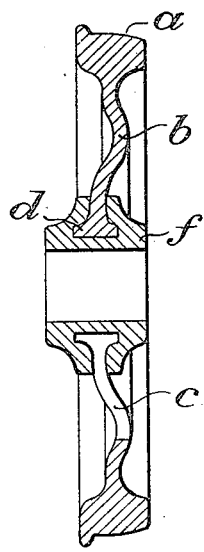
Figure 4:
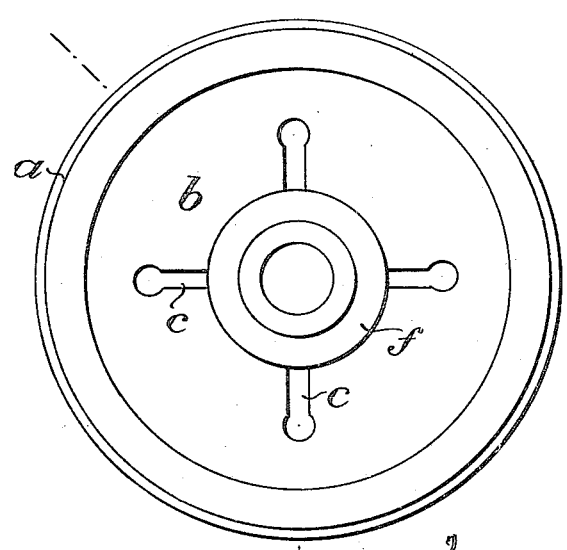

In the accompanying drawing is shown, by way of example, a car-wheel made according to my invention:

Figures 1 and 2 representing a section and an elevation respectively of the one portion of the wheel, *i. e.* the disk and the tire, and Figs. 3 and 4 represent both a section and an elevation; the two portions of the wheel being rigidly joined.

The disk *b*, which may be cast, forged, pressed, or rolled in one piece with the tire *a*, is provided with radially disposed slots *c*, while its inner edge portion *d*, to which is to be joined the other wheel portion, namely the hub *f*, is so shaped as to permit of a solid connection being formed. Thus, for instance, the said edge portion may be made of a T-shaped cross section, so that in the course of construction axial and radial stress exerted relatively to the wheel-disk, will arise which is within the limit of stress allowed. The disk part may either be of a plane, conical, undulated or of any other suitable shape.

When the wheel portion, consisting of the tire and the disk, is ready, and after it has been suitably treated by heat in accordance with the alloy or composition of steel employed, the hub portion is joined to it by forging or pressing the hub upon the disk. To this end the hub is originally given the shape, say of a cylinder, one end of which is provided with a flange or collar which is forced across the inner edge of the disk by means of the forging or pressing operation. The hub will then, after it has cooled down, securely hold the disk by shrinkage. This shrinkage is far slighter than that occurring on the wheel in the course of the treatment by heat, since the temperature at which the cooling down of the forged or pressed on hub is initiated, is considerably lower than that occurring during the treatment by heat. Beyond this, the dimension of the hub relatively to the diameter of the wheel is small so that the measure of contraction will be much less. Said measure is so chosen that between the disk on the one hand and the hub on the other there will occur a stress of such magnitude as to secure a rigid connection between the two parts.

What I claim is:

The method of making car wheels of the disk type, for use on railway-carriages, the said method consisting in first heating a block of steel and forming from it in one piece the tire and the disk portion with a central hub opening in the latter, making the edge of the disk portion surrounding said central hub opening of a T-shaped cross-section and providing radial slots in the disk portion terminating in said central hub opening and extending to points near the tire, then making the hub portion as a separate part in the shape of a flanged cylinder, then subjecting the said tire and disk portion and the said hub portion to a suitable heat treatment, then inserting the heated hub portion into the central hub opening of the said disk portion and forcing the hub portion around the edge of said circular hub opening and finally cooling off the finished wheel.

In testimony whereof I have hereunto set my hand in presence of two subscribing witnesses.

FRIEDRICH SCHAFFER.

Witnesses:
ARTHUR LINDENSTEAD,
AUGUST FUGGER.

Copies of this patent may be obtained for five cents each, by addressing the "Commissioner of Patents, Washington, D. C."